(12) United States Patent
Vencheva

(10) Patent No.: US 12,175,449 B2
(45) Date of Patent: Dec. 24, 2024

(54) METHOD FOR INITIATING PERFORMING A PAYMENT TRANSACTION AND A SYSTEM FOR IMPLEMENTING THEREOF

(71) Applicant: Olga Vladimirovna Vencheva, Mississauga (CA)

(72) Inventor: Olga Vladimirovna Vencheva, Mississauga (CA)

(73) Assignee: Olga Vladimirovna Vencheva, Mississauga (CA)

( * ) Notice: Subject to any disclaimer, the term of this patent is extended or adjusted under 35 U.S.C. 154(b) by 336 days.

(21) Appl. No.: 17/830,351

(22) Filed: Jun. 2, 2022

(65) Prior Publication Data
US 2023/0093347 A1    Mar. 23, 2023

(30) Foreign Application Priority Data

Sep. 21, 2021   (RU) ................................ 2021127589

(51) Int. Cl.
*G06Q 20/32*    (2012.01)
*G06Q 20/38*    (2012.01)

(52) U.S. Cl.
CPC ......... *G06Q 20/327* (2013.01); *G06Q 20/322* (2013.01); *G06Q 20/382* (2013.01)

(58) Field of Classification Search
CPC .. G06Q 20/32; G06Q 20/3224; G06Q 20/327; G06Q 20/322; G06Q 20/382; G06Q 20/3278
See application file for complete search history.

(56) References Cited

U.S. PATENT DOCUMENTS

| 11,871,237 | B1 * | 1/2024 | Han | H04W 92/10 |
| 2015/0031393 | A1 * | 1/2015 | Post | H04W 4/025 |
| | | | | 455/456.2 |
| 2015/0051993 | A1 * | 2/2015 | Moshfeghi | H04B 5/73 |
| | | | | 705/18 |
| 2017/0004475 | A1 * | 1/2017 | White | G06Q 20/322 |

* cited by examiner

*Primary Examiner* — Siu M Lee
(74) *Attorney, Agent, or Firm* — SOROKER AGMON NORDMAN RIBA

(57) ABSTRACT

The invention relates to the field of technical infrastructures that provide for performing financial transactions between economic entities, in particular to payment systems that provide for, on the one hand, convenience and simplicity of a payment process, and on the other hand its security.

Figure 1:
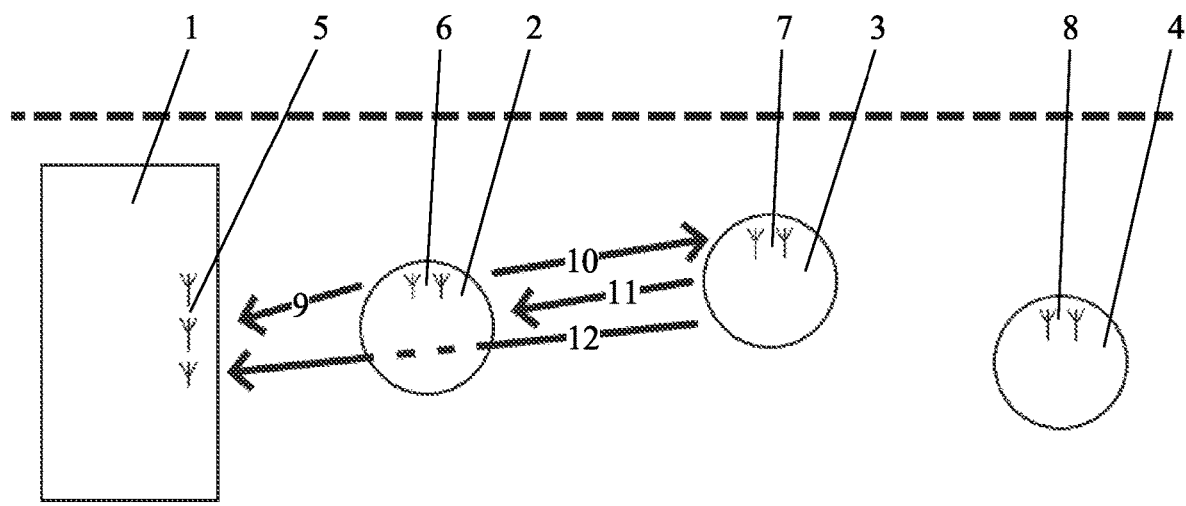

The claimed invention is a method for initiating performing a payment transaction and a system for implementing thereof, implementation of which ensures the achievement of a technical result, which consists in simplifying the process of installation, adjustment, debugging and maintenance of the system, reducing the likelihood of the occurrence of errors, failures and faults in its operation, allowing to accurately determine which of the users' mobile devices is closer to the payment terminal device than the rest in the conditions when the users queue up, as well as optimizing the set of software and hardware used for the task of initiating performing a payment transaction without having to pick up the mobile device.

12 Claims, 2 Drawing Sheets

METHOD FOR INITIATING PERFORMING A PAYMENT TRANSACTION AND A SYSTEM FOR IMPLEMENTING THEREOF

The invention relates to the field of technical infrastructures that provide for performing financial transactions between economic entities, in particular to payment systems that provide for, on the one hand, convenience and simplicity of a payment process, and on the other hand its security.

Currently, the development of information technologies has allowed to significantly simplify and accelerate the payment process. For example, the Near-Field Communication (NFC) technology, i.e. the technology of near field wireless data transmission, which allows to exchange data between devices located at a distance of about 10 centimeters, has become widespread. Using NFC chips in users' mobile devices (for example, smartphones or "smart" watches), in turn, has enabled the payment process to rise to a new level of convenience and security. At the same time, despite the fact that the user does not need to hand over the device with which he makes payments to the seller, he still needs to get it out of his pocket or bag and bring it to the payment terminal device at an appropriate distance to initiate performing a payment transaction. It is obvious that the next preferred step in the development technologies in this field is the development of a method for initiating performing a payment transaction and for performing it subsequently that could become widespread due to its ease of introduction in the existing systems and would ensure that the user does not need to pick up the device with which the payment is made and to bring it to the payment terminal in principle.

Various methods for initiating performing a "hands-free" payment transaction are known in the art which, however, are not widely used. In particular, a solution is known from the prior art for a U.S. patent application No. 20150051993, which claims a method for initiating performing a payment transaction comprising exchanging of radio signals between the payment terminal device and each mobile device from a group of mobile devices located within a range of a transceiver of the payment terminal device, and between each pair of the mobile devices from the group; determining the relative position of the mobile devices with respect to the payment terminal device using parameters of the radio signals; selecting a mobile device from the group based on the determined relative positions of the mobile devices and the payment terminal device; and initiating performing a payment transaction using the selected mobile device and the payment terminal device. According to the method of the above U.S. patent application, the relative positions of the mobile devices are determined by finding coordinates of each of the devices, after which it is established whether these coordinates are within a defined area around the payment terminal device. In one of the preferred implementations, several transceivers spatially spaced throughout the room are used, which by exchanging radio signals with a mobile device determine the parameters of the radio signals and transmit them to a payment terminal device for further processing, namely, to determine the coordinates of the location of the mobile device using known methods of radio location. Further, another preferred implementation of the method specifies a possibility of using the exchanging of radio signals between mobile devices of the users in order to transmit the information allowing to update the coordinates of their locations. In this case, a mobile device the coordinates of which are required to be learned or updated requests such information from the mobile devices located nearby, it being understood that such information contains the coordinates of their locations. It is also specified that such information can be sorted in various ways, for example, a distance between the devices can be estimated and priority can be given to the information received from the nearest devices, which means the devices having the closest coordinates, or an information update timestamp can be estimated, and accordingly a device the information from which was last updated can be selected. The described method also proposes the use of a plurality of various auxiliary devices (satellites, mobile communication towers, Wi-Fi hotspots, RFID tags, etc.) for the purpose of determining and updating the location of the user's mobile device. It is obvious to a person skilled in the art that the implementation of this method requires the use of a rather complex system that requires a lengthy and labour-intensive process of its installation (in case it is necessary to install transceivers connected to the terminal), adjustment, debugging and maintenance. In addition, due to the high complexity of the implementation of such a system, there is evidently an increase in the likelihood of the occurrence of malfunctions, failures and errors in its operation, which, taking into account the area of its application, urgently requires a high level of fault tolerance and the security of confidential data, renders it poorly suited for widespread use. On the other hand, it should be noted that the technical solution of the above patent application is described in the most general manner and covers a plurality of its implementations, however, in all those implementations, it will generally require the use of a redundant set of technical means (both software and hardware) in terms of the problem at solving which it is directed.

So, it should be taken into account that often making a payment through the payment terminal device must be organized in a certain way, namely, it requires the users to queue up and making a payment in the order of the queue. Otherwise, it will be difficult for the users to determine who approached the terminal first and, accordingly, whose turn it is to make a payment. The problem of accurately determining which of the mobile devices is closer than the rest to the payment terminal device and, accordingly, determining the order of the users in the queue is not covered in the above patent application. The solution in the above patent application is aimed at determining whether the user's mobile device entered the specific area around the payment terminal device, but it does not, in any way, describe how and which mobile device should be selected if two or more mobile devices enter the specific area around the payment terminal device. It should be understood that in order to initiate performing a payment transaction in a situation when the users queued up, information about specific location coordinates of each of the users is redundant. Moreover, it should be understood that in the event of applying this technical solution for performing payment transactions in practice, it is necessary to calculate the coordinates of the mobile devices with high precision ensuring determining without errors which of the users' mobile devices is closer to the payment terminal device. Otherwise, a situation may arise when performing a payment transaction is mistakenly initiated by using the mobile device of a user who is not first in the queue, and therefore he will pay for the product of the user who is first in the queue. In addition, the inaccuracy in determining the coordinates can be deliberately used for fraudulent purposes.

With regard to the aspect of using the exchanging of radio signals between the mobile devices of the users in order to transfer the information that allows to update the coordinates of their locations, in order to effectively use such information, information about the location of the nearest mobile devices presumably should be more reliable than information about the location of a mobile device the coordinates of which need to be updated, however, it is completely unclear what ensures its higher reliability, since all the mobile devices, in fact, are in the same conditions. It is obvious, however, that information about the location of the nearby mobile devices will not be able to help a mobile device with an unknown location (or a location requiring updating) with determining whether it is closer to the terminal than the rest.

There is a possibility to eliminate all the above-listed disadvantages. This technical solution is chosen as a prototype of the claimed solution.

Thus, the problem to be solved by the present invention is to provide a method for initiating performing a payment transaction and a system for implementing thereof, implementation of which would ensure the achievement of a technical result consisting in simplifying the process of installation, adjustment, debugging and maintenance of the system, reducing the likelihood of the occurrence of errors, failures and faults in its operation, allowing to accurately determine which of the users' mobile devices is closer to the payment terminal device than the rest in the conditions when the users queue up, as well as optimizing the set of software and hardware used for the task of initiating performing a payment transaction without having to pick up the mobile device.

The problem is solved by developing a method for initiating performing a payment transaction, comprising exchanging of radio signals between a payment terminal device and each user's mobile device from a group of users' mobile devices located within a range of a transceiver of the payment terminal device, and between each pair of the mobile devices from the group; determining the relative position of the mobile devices with respect to the payment terminal device using parameters of the radio signals; selecting a mobile device from the group based on the determined relative positions of the mobile devices and the payment terminal device; and initiating performing a payment transaction using the selected mobile device and the payment terminal device, wherein the direction of the radio signal and the strength of the radio signal are used as the parameters of the radio signal, and the mobile device for which the following conditions are fulfilled is selected: the direction of the radio signal transmitted by this mobile device to the payment terminal device does not coincide with any of the directions of the radio signals transmitted by this mobile device to other mobile devices from the pairs including this mobile device, or the direction of the radio signal received by this mobile device from the payment terminal device does not coincide with any of the directions of the radio signals received by this mobile device from other mobile devices from the pairs including this mobile device; the value of the strength of the radio signal received by the payment terminal device from this mobile device is above a preset threshold value, or the strength of the radio signal transmitted by the payment terminal device to this mobile device is above a preset threshold value; and the direction of the radio signal received by the payment terminal device from this mobile device coincides with the direction of the radio signals received by the payment terminal device from the mobile devices, which is preset in the payment terminal device, or the direction of the radio signal transmitted by the payment terminal device to this mobile device coincides with the direction of the radio signals transmitted by the payment terminal device to the mobile devices, which is preset in the payment terminal device.

Also, the problem is solved by developing a system for performing a payment transaction comprising a group of users' mobile devices and a payment terminal device, each of which includes at least one processor, a transceiver controlled by at least one processor and at least one computer-readable medium connected to the processor, including program instructions executed by the processor, wherein the program instructions of the mobile devices provide for the exchanging of radio signals between each pair of the mobile devices located within the range of the transceiver of the payment terminal device, and the program instructions of the payment terminal device together with the program instructions of the mobile devices provide for the exchanging of radio signals between the payment terminal device and each mobile device from a group of the mobile devices located within the range of the transceiver of the payment terminal device, determining the relative positions of the mobile devices with respect to the payment terminal device using parameters of the radio signals; selecting a mobile device from the group based on the determined relative position of the mobile devices and the payment terminal device; and initiating performing a payment transaction using the selected mobile device and the payment terminal device, wherein the direction of radio signal and the strength of radio signal are the parameters of radio signal, and the program instructions providing for selecting a mobile device from the group include the instructions that provide for selecting a mobile device for which the following conditions are fulfilled: the direction of the radio signal transmitted by this mobile device to the payment terminal device does not coincide with any of the directions of the radio signals transmitted by this mobile device to other mobile devices from the pairs including this mobile device, or the direction of the radio signal received by this mobile device from the payment terminal device does not coincide with any of the directions of the radio signals received by this mobile device from other mobile devices of the pairs including this mobile device; the value of the strength of the radio signal received by the payment terminal device from this mobile device is above a preset threshold value, or the value of the strength of the radio signal transmitted by the payment terminal device to this mobile device is above a preset threshold value; and the direction of the radio signal received by the payment terminal device from this mobile device coincides with the direction of the radio signals received by the payment terminal device from the mobile devices, which is preset in the payment terminal device, or the direction of the radio signal transmitted by the payment terminal device to this mobile device coincides with the direction of the radio signals transmitted by the payment terminal device to the mobile devices, which is preset in the payment terminal device.

As can be seen, the claimed system that implements the claimed method is characterized by an extremely simple installation process, since the seller is required to install one device only, namely a payment terminal device, and it does not require an installation of additional sensors connected to the payment terminal device. Adjusting the system consists only in installing the appropriate program instructions on the payment terminal device and the mobile devices of the users (potential buyers). Due to the fact that the system, in fact, uses the minimum required set of hardware, while some of these means, namely the mobile devices, belong to the users, the problems associated with debugging and maintaining the devices of the system are minimal. The program instructions installed on a mobile device should preferably be in the form of a standard application that any user can freely download and install on his device. In the process of debugging the system, in this case, it is sufficient to check its operation using several mobile devices, preferably from different manufacturers, to check the correctness of setting in the payment terminal device preset values of strength and a direction of the radio signals received/transmitted by the payment terminal device to make sure that the payment transaction is initiated correctly. It is obvious that the "simpler" the system is, and the more optimally a set of hardware and software for its operation is selected, the easier it is to ensure its fault tolerance, to reduce the number of errors and failures in its operation. The claimed system, in comparison with the prototype, does not require the use of transceivers spatially spaced throughout the room, as well as various auxiliary devices (satellites, mobile communication towers, Wi-Fi hotspots, RFID tags and the like). As can be seen, the claimed system has a relatively simpler hardware and software, therefore, in these aspects, it has a clear advantage over the prototype such that it can be easily introduced in the existing systems and be freely and universally applied.

With regard to the application of the claimed system and method in practice, in comparison with the prototype according to which the coordinates of the location of users' mobile devices are determined and the fact of them being located within a certain boundary around the payment terminal device is established, which is, firstly, by itself a redundant task and, secondly, due to the complexity of such a task requires significant software and hardware resources to ensure high operational accuracy, the present invention is aimed at a more "narrow" task of determining and selecting a mobile device that is closer to the payment terminal device than other mobile devices in the conditions of users queuing up, which can be achieved with high accuracy by means of a minimum set of hardware. So, according to the claimed method, all devices of the system exchange radio signals and determine the direction of radio signals, after which fulfilment of a number of conditions is checked. The first condition (checking that the direction of the radio signal transmitted by this mobile device to the payment terminal device does not coincide with any of the directions of the radio signals transmitted by this mobile device to other mobile devices from the pairs that include this mobile device, or the direction of the radio signal received by this mobile device from the payment terminal device does not coincide with any of the directions of the radio signals received by this mobile device from other mobile devices from the pairs that include this mobile device) indicates that when the users are queued up, there are no other mobile devices on the way between this mobile device of a user and the payment terminal device, therefore, this mobile device is located first in the queue. The second condition (checking that the value of the strength of the radio signal received by the payment terminal device from this mobile device is above a preset threshold value, or the value of the strength of the radio signal transmitted by the payment terminal device to this mobile device is above a preset threshold value) indicates that the user's mobile device is close enough to the payment terminal device to be certain of the intention of the user of this device to initiate a payment transaction. This is especially important for a situation when there is only one user in the queue, and it is necessary to make sure that in general he has the intention to use the payment terminal device, and does not just pass by it at a certain distance. The third condition (checking that the direction of the radio signal received by the payment terminal device from this mobile device coincides with the direction of the radio signals received by the payment terminal device from the mobile devices, which is preset in the payment terminal device, or the direction of the radio signal transmitted by the payment terminal device to this mobile device coincides with the direction of the radio signals transmitted by the payment terminal device to the mobile devices, which is preset in the payment terminal device), allows to select from all the mobile devices located within the range of the payment terminal device transceiver only those devices that are queued up in a certain direction from the payment terminal device. This is especially important, for example, in a situation in a store where there are many nearby checkouts, to each of which there is a queue, and in this case the payment terminal device must "understand" which of the queues pertains to it. It is also important to take into account this aspect so that the payment terminal device does not consider the mobile devices with which payment has already been made and which are already located behind the place of payment, but, nevertheless, still fall within the range of the transceiver of the payment terminal device. Thus, the claimed method and system ensure the accuracy of determining which of the users' mobile devices is located closer to the payment terminal device than the other mobile devices and, consequently, ensure selecting without errors a mobile device of a user, by means of which it is necessary to initiate performing a payment transaction. Thanks to the implementation of such a system and a method, it is made possible to perform a payment transaction without having to pick up the mobile device.

The term "direction of the radio signal" should be understood as a certain sector from the range of the transceiver of a mobile device or a payment terminal device in the horizontal plane, wherein the sector is limited by an angle, the value of which is set when adjusting or debugging the system. The value of this angle should be such that taking into account the distance between the users and their mobile devices respectively, as well as between the mobile device of the user standing first in the queue and the payment terminal device, the mobile devices in the queue are clearly enough separated from other mobile devices within the range of the transceiver. Thus, in a preferred implementation of the present invention, the direction is set by an angle in the range of 5-40 degrees. It should be understood that according to the claimed method, in general, there is no need to determine the direction of the radio signal vertically, since the users, being in the queue, are conventionally located at the same level vertically, wherein the minor difference in level between their mobile devices when using the claimed method and system will not in any way affect the accuracy of selecting a mobile device located closer to the payment terminal device than other mobile devices and, therefore, this difference can be neglected.

Regarding the above-mentioned threshold value of the radio signal strength set in the payment terminal device, it should be understood that it is preferable to select it in such a range as to ensure that the radio signal of the mobile device exceeds the threshold value when the mobile device approaches a distance of 1-3 meters from the payment terminal device. Such a range, in combination with other conditions described above for selecting a mobile device to initiate a payment transaction, will ensure a correct operation of the system, namely, selecting a device that is closer to the payment terminal device than other devices and located close enough so that to reliably come to a conclusion about the user's intention to make a payment.

It should be understood that in order to be able to determine the direction of radio signals at the hardware level, the transceivers of the mobile devices of the users and of the payment terminal device should have a certain configuration. Thus, in a preferred implementation, the exchanging of radio signals is carried out using a set of antennas included in the transceiver of the payment terminal device and sets of antennas included in the transceiver of each mobile device from the group. The use of a set of antennas instead of one antenna will allow to use various methods of radio location known in the art through receiving/transmitting the signals of each of the antennas and subsequent software processing, which consists in comparing the parameters of these signals. Thus, in a preferred implementation, the direction of the radio signals is determined using the "angle of arrival" (AoA) and/or "angle of departure" (AoD) methods.

With regard to a specific software and hardware implementation of the system device transceivers, the following should be noted. Trends in the development of information technologies in the field of mobile devices, such as smartphones, are currently leading to the fact that all devices, without exception, will be equipped with an ability to use energy-efficient short-range wireless communication technology adapted to determine the direction of received/transmitted radio signals, which will significantly extend the functionality of such devices. In particular, such technologies include Bluetooth version 5.1 and 5.2 technology, which also uses the above "angle of arrival" (AoA) and/or "angle of departure" (AoD) methods. Thus, in a preferred implementation of the present invention, the exchanging of radio signals is carried out via the Bluetooth protocol.

In an alternative preferred implementation of the present invention, another protocol for the exchanging of radio signals, Ultra Wideband (UWB), is used, which is at the present sufficiently widely adopted by manufacturers of mobile devices. This technology also uses the above AoA and AoD radio location methods.

As far as the mobile device itself is concerned, it can preferably be a smartphone and/or a smart card configured to operate in an active radio communication mode.

It should be noted that when applying the system in practice, a great number of non-standard situations may arise, for instance, when a new user stands not in the order of the queue, but, for example, in front of the first user going in the queue, or when two mobile devices of the users are within the range of the transceiver of the payment terminal device at the same time, besides, one of the users can hold the device in his hands, while the other user will have the device in the bag and, thus, there will be additional interferences for the exchanging of radio signals. Meanwhile, in all these situations, the claimed method and the system characterized by the specified set of essential features will work correctly.

These preferred implementations of the method for initiating performing a payment transaction and the system for performing a payment transaction according to the present invention are given as an example and do not limit the scope of claims of this application, meanwhile, the claimed method and the system can be implemented in any other way characterized by the claimed set of essential features.

The claimed invention will be explained by drawings given below.

FIGS. 1 to 4 schematically illustrate a system for performing a payment transaction (a view from above) according to a preferred implementation of the present invention.

FIG. 1 illustrates exchanging of signals between the mobile devices of the users and a payment terminal device. As seen in the Figure, the system for performing a payment transaction comprises a payment terminal device 1 and a group of mobile devices 2, 3 and 4 of the users who are queued up. The transceivers of the payment terminal device 1 and of the mobile devices 2, 3 and 4 comprise sets of antennas 5, 6, 7 and 8, respectively. The mobile device 2 located first in the queue transmits a radio signal 9 to the payment terminal device 1 and a radio signal 10 to the mobile device 3 located second in the queue, which, in turn, transmits a radio signal 11 to the device 2 and a radio signal 12 to the device 1. For the sake of clarity of the information presented in the figure, the exchanging of signals of the device 4 with the devices 1, 2 and 3 is not shown; however, it should be clear that according to the claimed invention all devices of the system exchange radio signals with each other.

Figure 2:
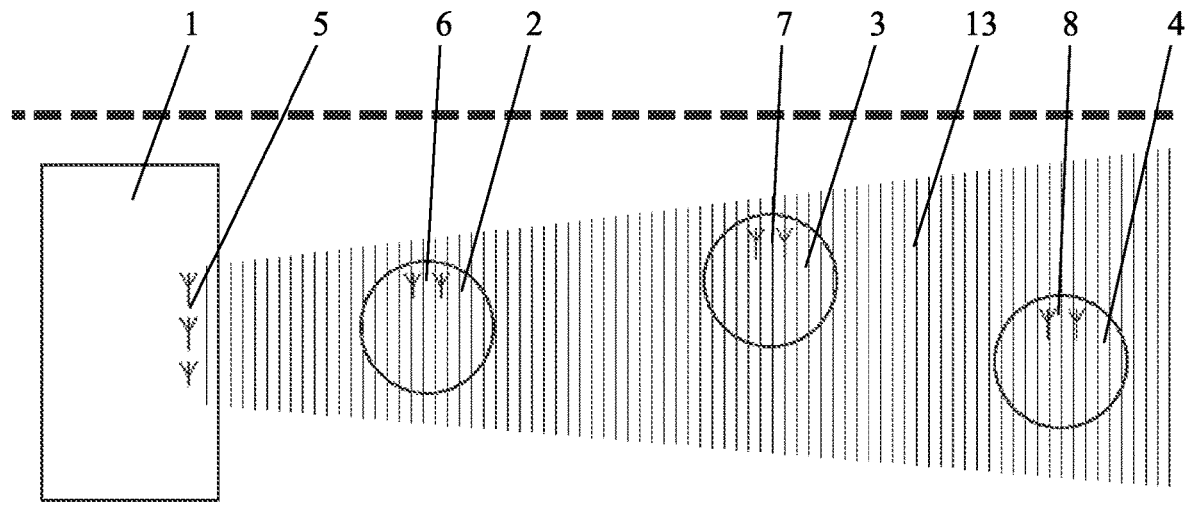

FIG. 2 shows a direction 13 of the radio signals received by the payment terminal device 1 from the mobile devices 2, 3 and 4, which is preset in the payment terminal device 1.

Figure 3:
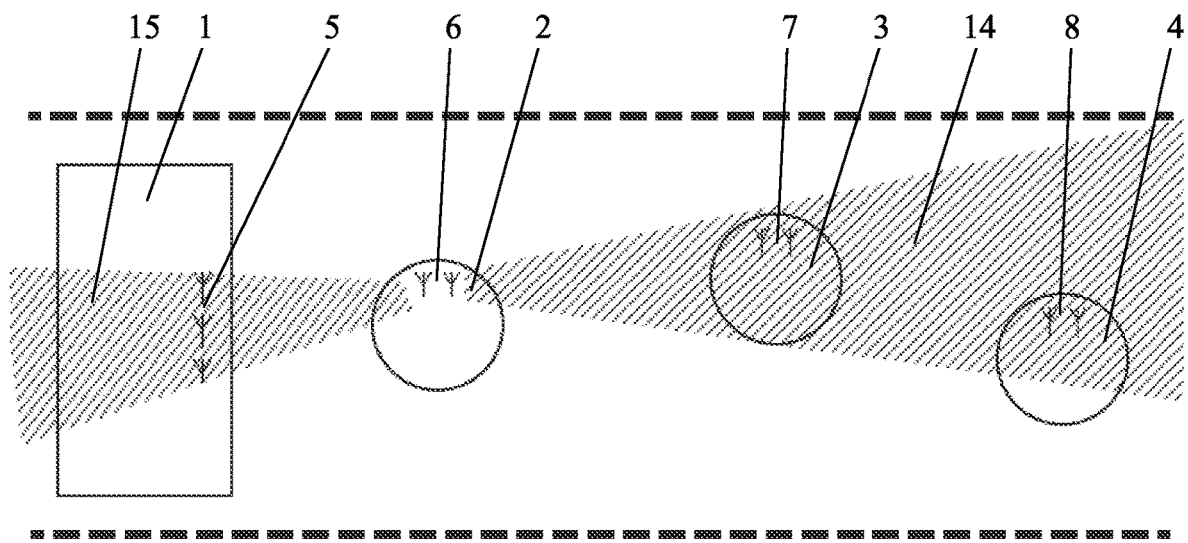

FIG. 3 shows a direction 14 of the radio signal 10 transmitted by the mobile device 2 located first in the queue to the mobile device 3 located second in the queue and a direction 15 of the radio signal 9 transmitted by the mobile device 2 located first in the queue to the payment terminal device 1.

Figure 4:
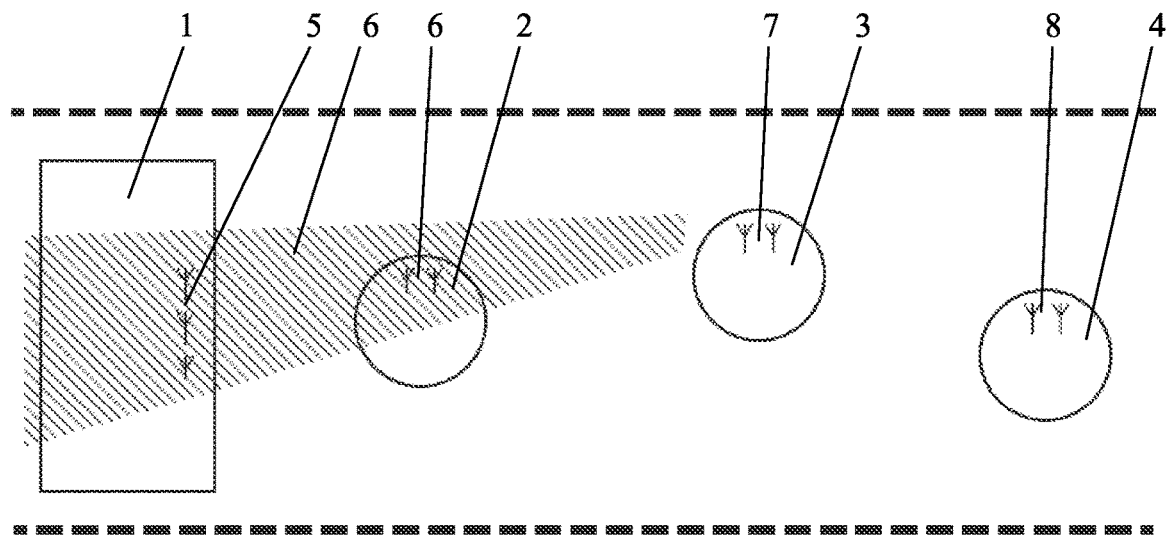

FIG. 4 shows a direction 16 of the radio signal 12 transmitted by the mobile device 3 located second in the queue to the payment terminal device 1 and the radio signal 11 transmitted by the mobile device 3 located second in the queue to the mobile device 2 located first in the queue, respectively.

The claimed invention made according to the preferred implementation shown in the figures is embodied as follows.

Preliminarily, the payment terminal device 1 is mounted at the point of sale and adjusted, during which adjustment the program instructions are set in accordance with the claimed invention, such a threshold value of the strength of the radio signal is set that it is ensured that the threshold value is exceeded when a mobile device approaches a distance of, for example, 1 meter from the payment terminal device 1 (which will allow to determine that the user's mobile device is close enough to the payment terminal device 1 to be sure of the intention of the user of this device to initiate a payment transaction), and a direction 13 of the radio signals received by the payment terminal device 1 from the mobile devices is set (which will allow to select only those mobile devices that are queued up in a certain direction from the payment terminal device 1 of all the mobile devices located within the range of the transceiver of the payment terminal device 1). Appropriate program instructions (for example, in the form of a freely available application) that allow to perform the relevant steps of the claimed method are preinstalled on the mobile devices 2, 3 and 4. During operation of the system, the users wishing to make a payment queue up with respect to the payment terminal device 1 in accordance with the preset direction 13 (this requires certain aids that orient the users in space in order to prevent queueing in a wrong direction, which can be realized, for example, by installing a fence). In this case, radio signals are exchanged between the payment terminal device 1 and the mobile devices 2, 3 and 4 of the users and between each pair of the mobile devices from the group (pair of the devices 2 and 3, pair of the devices 3 and 4, pair of the devices 2 and 4).

As the queue advances, the fulfilment of the conditions described above for each of the mobile devices 2, 3 and 4 is continuously checked. Thus, using the example of the device 2, it can be seen that the direction 15 of the radio signal 9 transmitted by the mobile device 2 to the payment terminal device 1 does not coincide with any of the directions of the radio signals transmitted by this mobile device 2 to other mobile devices from the pairs including this mobile device 2, in particular, it does not coincide with the direction 14, moreover, it is almost opposite to it, since the devices 2 and 3 follow each other. In this case, the radio signal 12 transmitted by the device 3 to the device 1 and the radio signal 11 transmitted by the device 3 to the device 2 have the same direction 16. The situation with the device 4 is similar to the situation with the device 3. Thus, this condition is fulfilled for the device 2 and is not fulfilled for the devices 3 and 4.

All the three devices 2, 3 and 4 are located such that the direction of the radio signals received by the device 1 from the devices 2, 3 and 4, in particular the directions 15 and 16 of the radio signals 9 and 12, respectively, coincide with the direction 13 preset in the device 1. Thus, this condition is met by all the three devices 2, 3 and 4.

When the device 2 approaches a distance less than one meter from the device 1, the value of the strength of the radio signal 9 will exceed the threshold value preset in the device 1. In this case, the devices 3 and 4 are farther, hence, the value of the strength of the radio signals transmitted by them to the device 1 will not exceed the preset value. Thus, only the device 2 will meet this condition. However, it should be noted that it is theoretically possible for a mobile device that is not the first in the queue to have a transceiver of such high power that it will ensure exceeding the specified threshold despite the fact that the device is relatively far away. Nevertheless, in view of the fact that in order for the device to be selected to initiate a payment transaction, it is necessary to simultaneously fulfil all the three conditions, the claimed system and method will work correctly and will ensure selecting without errors a mobile device that comes first in the queue.

In this way, a relative position of the devices 2, 3 and 4 with respect to the device 1 is determined using the parameters of the directions 13, 14, 15 and 16 and the strength of the radio signals 9, 10, 11 and 12, and a device from the group of devices 2, 3 and 4 is selected based on the determined relative position. Next, performing a payment transaction is initiated using the selected device 2 and the payment terminal device 1.

It should be understood that a variety of options of performing a payment transaction are possible, including aspects of user and mobile device verification, after performing a payment transaction is initiated in accordance with the claimed invention. One of such options as an example confirming the applicability of the claimed invention is given below.

For this implementation of the present invention, the mobile devices must comprise a secure data storage and program execution element (Secure Element (SE)), public and private keys, and certificates. Solely software solutions, such as Host Card Emulation (HCE) or Trusted Execution Environment (TEE) can be an alternative to the SE software and hardware solution, if such solution is not available in the mobile device, that is, a secure area of the main processor that ensures a high level of data confidentiality and integrity protection can be used.

In this implementation, a chip of a mobile device transceiver transmits at regular intervals a timestamp and a generated random number to an application stored in a SE (or, alternatively, HCE, TEE) element, which, in turn, encrypts the received timestamp and the unpredictable number, as well as the counter value of the application itself and a unique identifier of the user by means of a symmetric key of the issuing bank of the payment card, which was obtained when the card was issued by diversifying the issuing bank's master key using the unique identifier of the user, was linked to the card when it was issued by the issuing bank (or by another issuer, for example, a transport operator, if the application is intended, for example, only for paying travel in a transport vehicle), as well as was recorded in the SE (HCE, TEE) element of the mobile device when registering the payment card in the application. Afterwards, the application encrypts the data packet, which includes the cryptogram obtained as a result of encryption using the symmetric key of the issuing bank, as well as the timestamp, unpredictable number and counter value in an unencrypted form with the public key of the issuing bank, which was also linked to the card during its issue and recorded in the SE (HCE, TEE) security element of the mobile device when registering the card, and sends a response (said encrypted data) to the transceiver chip.

The transceiver of the mobile device periodically generates and transmits to the surrounding space a unique identifier of the mobile device and the above encrypted data.

The payment terminal device, having determined the first mobile device in the queue and having initiated a payment transaction, reads the received unique identifier of the mobile device and encrypted data. Next, the payment terminal device sends a request with the unique identifier of the mobile device to the server (cloud service), which determines based on the database stored thereon, which issuing bank the unique identifier of the device belongs to, and returns the URL address of the issuing bank and the attributes of the user of the mobile device that were uploaded to the database during user's registration in the application (for example, a visual identifier (a "user image") and a name, login or nickname). The user may optionally be asked to select and agree to the proposed service (purchase), as well as to confirm the payment amount and his identifiers on the screen of the payment terminal device, but it is possible that the payment transaction occurs automatically, without requiring confirmation, for example, in the event of paying travel in a public transport vehicle.

Afterwards, the payment terminal device sends the encrypted data to the issuing bank server itself, which decrypts the data with a private key of the issuing bank, which is known to the issuing bank only. Next, the issuing bank server generates its own version of the cryptogram. For that end, the unique identifier of the user is used, by means of which the issuing banks server receives the issuing bank's symmetric key from the master key of the issuing bank through diversification. Using the unique symmetric key, the issuing banks server encrypts the received data (the unique identifier of the user, the timestamp, the unpredictable number and the counter value) and compares the received and calculated cryptograms.

If the cryptograms match, the issuing bank server checks that the timestamp in the message matches or is in the valid set "window" and authorizes the payment transaction, and informs the payment terminal device of this fact.

Thus, the claimed invention is a method for initiating performing a payment transaction and a system for implementing thereof, implementation of which ensures the achievement of a technical result, which consists in simplifying the process of installation, adjustment, debugging and maintenance of the system, reducing the likelihood of the occurrence of errors, failures and faults in its operation, allowing to accurately determine which of the users' mobile devices is closer to the payment terminal device than the rest in the conditions when the users queue up, as well as optimizing the set of software and hardware used for the task of initiating performing a payment transaction without having to pick up the mobile device.

It should be understood that the claimed method and system as defined in the appended claims are not necessarily limited to the specific features and embodiments described above. On the contrary, the specific features and embodiments described above are disclosed as examples implementing the claims, and other equivalent features may be covered by the claims of the present invention.

The invention claimed is:

1. A method for initiating performing a payment transaction comprising
    exchanging of radio signals between a payment terminal device and each user's mobile device from a group of users' mobile devices located within a range of a transceiver of the payment terminal device, and between each pair of the mobile devices from the group;
    determining a relative position of the mobile devices with respect to the payment terminal device using parameters of the radio signals;
    selecting a mobile device from the group based on the determined relative position of the mobile devices and the payment terminal device;
    and initiating performing a payment transaction using the selected mobile device and the payment terminal device,
    characterized in that
    a direction of the radio signals and a strength of the radio signals are used as the parameters of the radio signals,
    and the mobile device for which the following conditions are fulfilled is selected:
    the direction of the radio signal transmitted by this mobile device to the payment terminal device does not coincide with any of the directions of the radio signals transmitted by this mobile device to other mobile devices from the pairs including this mobile device, or the direction of the radio signal received by this mobile device from the payment terminal device does not coincide with any of the directions of the radio signals received by this mobile device from other mobile devices from the pairs including this mobile device;
    the value of the strength of the radio signal received by the payment terminal device from this mobile device is above a preset threshold, or the value of the strength of the radio signal transmitted by the payment terminal device to this mobile device is above a preset threshold value;
    and the direction of the radio signal received by the payment terminal device from this mobile device coincides with the direction of the radio signals received by the payment terminal device from the mobile devices, which is preset in the payment terminal device, or the direction of the radio signal transmitted by the payment terminal device to this mobile device coincides with the direction of the radio signals transmitted by the payment terminal device to the mobile devices, which is preset in the payment terminal device.

2. The method according to claim 1, wherein the direction is set by an angle in the range of 5-40 degrees.

3. The method according to claim 1, wherein such a threshold value of the strength of the radio signal is set that it is ensured that the threshold value is exceeded when the mobile device approaches a distance of 1-3 meters from the payment terminal device.

4. The method according to claim 1, wherein the exchanging of the radio signals is carried out using a set of antennas included in the transceiver of the payment terminal device and sets of antennas included in the transceiver of each mobile device from the group, and the direction of the radio signals is determined using an "angle of arrival" (AoA) and/or "angle of departure" (AoD) methods.

5. The method according to claim 4, wherein the exchanging of the radio signals is carried out using the Bluetooth protocol.

6. The method according to claim 1, wherein a smartphone and/or a smart card configured to operate in an active radio communication mode are/is used as a mobile device.

7. A system for performing a payment transaction comprising
    a group of users' mobile devices and a payment terminal device,
    each of which includes at least one processor, a transceiver controlled by the at least one processor and at least one computer-readable medium connected to the processor, including program instructions executed by the processor,
    wherein the program instructions of the mobile devices provide for
    an exchanging of radio signals between each pair of the mobile devices located within a range of the transceiver of the payment terminal device,
    and the program instructions of the payment terminal device together with the program instructions of the mobile devices provide for
    the exchanging of radio signals between the payment terminal device and each mobile device from the group of the mobile devices located within the range of the transceiver of the payment terminal device,
    determining a relative position of the mobile devices with respect to the payment terminal device using parameters of the radio signals;
    selecting a mobile device from the group based on the determined relative position of the mobile devices and the payment terminal device;
    and initiating performing a payment transaction using the selected mobile device and the payment terminal device,
    characterized in that
    a direction of the radio signals and a strength of the radio signals are used as the parameters of the radio signals,
    and the program instructions providing for selecting a mobile device from the group include the instructions that provide for selecting a mobile device for which the following conditions are fulfilled:
    the direction of the radio signal transmitted by this mobile device to the payment terminal device does not coincide with any of the directions of the radio signals transmitted by this mobile device to other mobile devices from the pairs including this mobile device, or the direction of the radio signal received by this mobile device from the payment terminal device does not coincide with any of the directions of the radio signals received by this mobile device from other mobile devices from the pairs including this mobile device;

the value of the strength of the radio signal received by the payment terminal device from this mobile device is above a preset threshold value, or the value of the strength of the radio signal transmitted by the payment terminal device to this mobile device is above a preset threshold value;

and the direction of the radio signal received by the payment terminal device from this mobile device coincides with the direction of the radio signals received by the payment terminal device from the mobile devices, which is preset in the payment terminal device, or the direction of the radio signal transmitted by the payment terminal device to this mobile device coincides with the direction of the radio signals transmitted by the payment terminal device to the mobile devices, which is preset in the payment terminal device.

8. The system according to claim 7, wherein the direction of the radio signal is set by an angle in the range of 5-40 degrees.

9. The system according to claim 7, wherein the threshold value of the strength of the radio signal is set such that it is ensured that the threshold value is exceeded when the mobile device approaches a distance of 1-3 meters from the payment terminal device.

10. The system according to claim 7, wherein the transceivers of the mobile devices and of the payment terminal device comprise sets of antennas, and the program instructions of the mobile devices and of the payment terminal device include the instructions providing for determining the direction of the radio signals using an "angle of arrival" (AoA) and/or "angle of departure" (AoD) methods.

11. The system according to claim 10, wherein the transceivers of the mobile devices and of the payment terminal device are configured to exchange the radio signals via the Bluetooth protocol.

12. The system according to claim 7, wherein the mobile device is a smartphone and/or a smart card configured to operate in an active radio communication mode.

* * * * *